US009967819B2

United States Patent
Sun

(10) Patent No.: US 9,967,819 B2
(45) Date of Patent: *May 8, 2018

(54) METHOD FOR PROCESSING DATA ASSOCIATED WITH IDLE MODE SIGNALING REDUCTION IN A WIRELESS COMMUNICATION SYSTEM

(71) Applicant: LG ELECTRONICS INC., Seoul (KR)

(72) Inventor: Li-Hsiang Sun, San Diego, CA (US)

(73) Assignee: LG ELECTRONICS INC., Seoul (KR)

(*) Notice: Subject to any disclaimer, the term of this patent is extended or adjusted under 35 U.S.C. 154(b) by 0 days. days.

This patent is subject to a terminal disclaimer.

(21) Appl. No.: 15/453,467

(22) Filed: Mar. 8, 2017

(65) Prior Publication Data

US 2017/0181084 A1      Jun. 22, 2017

Related U.S. Application Data

(63) Continuation of application No. 14/788,520, filed on Jun. 30, 2015, now Pat. No. 9,622,178, which is a
(Continued)

(30) Foreign Application Priority Data

Aug. 10, 2012   (WO) ................ PCT/KR2012/006365

(51) Int. Cl.
*G08C 17/00* (2006.01)
*H04W 52/02* (2009.01)
(Continued)

(52) U.S. Cl.
CPC ..... *H04W 52/0225* (2013.01); *H04L 27/2602* (2013.01); *H04W 52/0212* (2013.01); *H04W 72/0446* (2013.01); *H04W 88/06* (2013.01)

(58) Field of Classification Search
CPC .................................................. H04W 52/0225
(Continued)

(56) References Cited

U.S. PATENT DOCUMENTS

2008/0102896 A1   5/2008   Wang et al.
2008/0220782 A1   9/2008   Wang et al.
(Continued)

FOREIGN PATENT DOCUMENTS

CN          102083047 A     6/2011
KR     10-2009-0085640 A    8/2009
(Continued)

OTHER PUBLICATIONS

"3rd Generation Partnership Project; Technical Spefication Group Core Network and Terminals; Non-Access-Stratum (NAS) protocol for Evolved Packet System (EPS); Stage 3 (Release 10)," 3GPP TS 24.301 V10.3.0, Jun. 2011, 8 pages.
(Continued)

*Primary Examiner* — Guang Li
(74) *Attorney, Agent, or Firm* — Birch, Stewart, Kolasch & Birch, LLP

(57) ABSTRACT

A method is presented for controlling timers in a wireless communication system. When an idle mode signaling reduction (ISR) function of a user equipment (UE) is activated in the UE, a periodic tracking area update (P-TAU) timer and a periodic routing area update (P-RAU) timer are started. The P-TAU timer and the P-RAU timer run in the UE for updating a Mobility Management Entity (MME) and a Serving General packet radio service Support Node (SGSN) independently. The ISR function is activated when an update message activating the ISR function is received by the UE. When the P-TAU timer expires and the UE cannot initiate a tracking area update (TAU) procedure as a mobility management backoff (MM-BO) timer is running, a deactivate
(Continued)

ISR timer corresponding to a first type network is started. The MM-BO timer is a timer configured to start when a MM-BO time value is received in the UE.

12 Claims, 8 Drawing Sheets

Related U.S. Application Data continuation of application No. 14/559,689, filed on Dec. 3, 2014, now Pat. No. 9,088,986, which is a continuation of application No. 13/572,169, filed on Aug. 10, 2012, now Pat. No. 8,929,338.

(60) Provisional application No. 61/523,196, filed on Aug. 12, 2011.

(51) Int. Cl.
*H04L 27/26* (2006.01)
*H04W 72/04* (2009.01)
*H04W 88/06* (2009.01)

(58) Field of Classification Search
USPC .......................................................... 370/311
See application file for complete search history.

(56) References Cited

U.S. PATENT DOCUMENTS

| | | | |
|---|---|---|---|
| 2009/0213762 A1* | 8/2009 | Guo | H04W 68/06 370/254 |
| 2010/0061331 A1 | 3/2010 | Guo et al. | |
| 2011/0090857 A1 | 4/2011 | Guo | |
| 2011/0110308 A1 | 5/2011 | Liang et al. | |
| 2011/0116449 A1 | 5/2011 | Hu et al. | |
| 2011/0275371 A1 | 11/2011 | Roger | |
| 2011/0312348 A1* | 12/2011 | Kulakov | H04W 28/06 455/458 |
| 2012/0002545 A1* | 1/2012 | Watfa | H04W 48/06 370/235 |
| 2012/0082029 A1 | 4/2012 | Liao | |
| 2012/0115454 A1* | 5/2012 | Liao | H04W 60/02 455/418 |
| 2012/0157093 A1 | 6/2012 | Zhu et al. | |
| 2012/0179790 A1 | 7/2012 | Kim et al. | |
| 2012/0189016 A1 | 7/2012 | Bakker et al. | |
| 2012/0238236 A1 | 9/2012 | Liao | |
| 2012/0294143 A1 | 11/2012 | Niemi et al. | |
| 2012/0315890 A1 | 12/2012 | Suzuki et al. | |
| 2012/0329440 A1 | 12/2012 | Chin et al. | |
| 2013/0029631 A1 | 1/2013 | Tiwari | |
| 2013/0029632 A1 | 1/2013 | Tiwari | |
| 2013/0039339 A1* | 2/2013 | Rayavarapu | H04W 76/028 370/331 |
| 2013/0053041 A1 | 2/2013 | Li et al. | |
| 2013/0083777 A1 | 4/2013 | Rydnell et al. | |
| 2013/0223312 A1* | 8/2013 | Ai | H04W 80/04 370/311 |
| 2013/0260740 A1* | 10/2013 | Rayavarapu | H04W 76/046 455/422.1 |
| 2014/0078890 A1 | 3/2014 | Lu et al. | |
| 2014/0113627 A1* | 4/2014 | Gotou | H04W 60/005 455/435.1 |
| 2014/0247762 A1 | 9/2014 | Ai | |

FOREIGN PATENT DOCUMENTS

| | | |
|---|---|---|
| KR | 10-2009-0126282 A | 12/2009 |
| KR | 10-2011-0011574 A | 2/2011 |
| WO | WO 2010/086106 A1 | 8/2010 |
| WO | WO 2011/022896 A1 | 3/2011 |
| WO | WO 2011/081384 A2 | 7/2011 |

OTHER PUBLICATIONS

"3rd Generation Partnership Project; Technical Specification Group Services and System Aspects; General Packet Radio Service (GPRS) enhancements for Evolved Universal Terrestrial Radio Access Network (E-UTRAN) access (Release 10)," 3GPP TS 23.401 V10.4.0, Jun. 2011, 9 pages.

HTC, "Clarification of reachability management for back-off UE," Change Request, 3GPP TSG SA WG2 Meeting #84, S2-112017 (Revision of S2-111585), Apr. 11-15, 2011, Bratislava, Slovakia, 4 pages.

HTC, "Clarification of reachability management for back-off UE," Change Request, 3GPP TSG SA WG2 Meeting #84, S2-112200 (Revision of S2-112135, S2-112017 and S2-111585), Apr. 11-15, 2011, Bratislava, Slovakia, 3 pages.

3GPP, General Packet Radio Serice (GPRS) enhancements for Evolved Universal Terrestrial Radio Access Network (E-TRAN) access (Release 9), Jun. 6, 2011, Third Generation Partnership Project, Version 9.9.0, pp. 20-21.

* cited by examiner

METHOD FOR PROCESSING DATA ASSOCIATED WITH IDLE MODE SIGNALING REDUCTION IN A WIRELESS COMMUNICATION SYSTEM

CROSS-REFERENCE TO RELATED APPLICATIONS

This application is a Continuation of U.S. application Ser. No. 14/788,520, filed on Jun. 30, 2015 (now U.S. Pat. No. 9,622,178 issued on Apr. 11, 2017), which is a Continuation of U.S. application Ser. No. 14/559,689, filed on Dec. 3, 2014 (now U.S. Pat. No. 9,088,986 issued on Jul. 21, 2015), which is a Continuation of U.S. application Ser. No. 13/572,169, filed on Aug. 10, 2012 (now U.S. Pat. No. 8,929,338 issued on Jan. 6, 2015), which claims priority under 35 U.S.C. § 119(e) to U.S. Provisional Application No. 61/523,196, filed on Aug. 12, 2011 and under 35 U.S.C. § 119(a) to PCT International Application No. PCT/KR2012/006365, filed on Aug. 10, 2012, all of which are hereby expressly incorporated by reference into the present application.

BACKGROUND OF THE INVENTION

Field of the Invention

The technical features of this document relate to wireless communications, and more particularly, to a method for processing data and controlling timers associated with idle mode signalling reduction (ISR) in a wireless network.

Discussion of the Related Art

The Third Generation Partnership Project (3GPP) Long Term Evolution (LTE) which is a set of enhancements to the Universal Mobile Telecommunications System (UMTS) is introduced as 3GPP Release 8. The 3GPP LTE uses orthogonal frequency division multiple access (OFDMA) for a downlink, and uses single carrier frequency division multiple access (SC-FDMA) for an uplink, and adopts multiple input multiple output (MIMO) with up to four antennas. In recent years, there is an ongoing discussion on 3GPP LTE-Advanced (LTE-A), which is a major enhancement to the 3GPP LTE.

The 3GPP LTE system provides an idle mode signalling reduction (ISR) function that allows a user equipment (UE) to remain simultaneous registered in a routing area associated with 2G/3G network and a tracking area associated LTE network. This allows the UE to make cell reselection between LTE and 2G/3G without additional signaling. Consequently, the ISR is a feature that reduces mobility signalling and improves the batter life of the UEs.

SUMMARY OF THE INVENTION

The technical features of this document provide a method and wireless apparatus for processing data associated with bearer resources, session management, and/or mobility management in a wireless network transmitting a radio signal based on a number of orthogonal frequency division multiplexing (OFDM) symbols. Further, the technical features of this document provide a method and wireless apparatus for controlling a number of timers associated with ISR function. The method is applicable to a user equipment (UE) which moves between a coverage of the first type network and a coverage of the second type network and comprising:

In one aspect, receiving a UE location registration accept message indicating that the ISR function is enabled; starting a periodic tracking area updating (P-TAU) timer, which is used to periodically notify availability of the UE, when a UE location registration accept message is received; receiving a control message including an mobility management backoff (MM-BO) time value; starting an mobility management backoff (MM-BO) timer based on the MM-BO time value; and starting a deactivate ISR timer corresponding to the first type of network when the P-TAU timer expires and the MM-BO timer is running while the UE is in the coverage of the first type network.

The UE location registration accept message is a TAU accept message received via the first type network.

The UE location registration accept message is a routing area update (RAU) accept message received via the second type network.

The control message is a radio resource control (RRC) connection release message, a RRC connection reject message, a RAU reject message, or a TAU reject message.

The method further comprises starting, in response to the UE location registration accept message, a periodic routing area update (P-RAU) timer, wherein the P-TAU timer and P-RAU timer are running in the UE for updating a mobility management entity (MME) and a serving GPRS support node (SGSN), respectively, wherein the MME is associated with the first type network, and the SGSN is associated with the second type network.

The method further comprises after the deactivate ISR timer of the first type of network is started, transmitting a tracking area update request when the UE's MM-BO expires and the UE is in the first type of network.

The method further comprises after the deactivate ISR timer expires, setting the UE's Temporary Identifier used in Next update (TIN), which is associated with RAU or TAU procedure, to a Packet Temporary Mobile Identity (P-TMSI).

In another aspect, a user equipment (UE) is further provided. The UE comprises a processor configured for: receiving a UE location registration accept message indicating that the ISR function is enabled; starting a periodic tracking area updating (P-TAU) timer, which is used to periodically notify availability of the UE, when a UE location registration accept message is received; receiving a control message including an mobility management backoff (MM-BO) time value; starting an mobility management backoff (MM-BO) timer based on the MM-BO time value; and starting a deactivate ISR timer corresponding to the first type of network when the P-TAU timer expires and the MM-BO timer is running while the UE is in the coverage of the first type network.

DETAILED DESCRIPTION OF THE INVENTION

The technology described below can be used in various wireless communication systems such as code division multiple access (CDMA), a frequency division multiple access (FDMA), time division multiple access (TDMA), orthogonal frequency division multiple access (OFDMA), single carrier frequency division multiple access (SC-FDMA), etc. The CDMA can be implemented with a radio technology such as universal terrestrial radio access (UTRA) or CDMA-2000. The OFDMA can be implemented with a radio technology such as institute of electrical and electronics engineers (IEEE) 802.11 (Wi-Fi), IEEE 802.16 (WiMAX), IEEE 802-20, evolved UTRA (E-UTRA), etc. The UTRA is a part of a universal mobile telecommunication system (UMTS). The $3^{rd}$ generation partnership project (3GPP) long term evolution (LTE) is a part of an evolved UMTS (E-UMTS) using the E-UTRA. The 3GPP LTE uses the OFDMA in the downlink and uses the SC-FDMA in the uplink. For clarity of explanation, the following description will focus on the 3GPP LTE (or the 3GPP LTE-A). However, the technical features of this description are not limited thereto.

Figure 1:
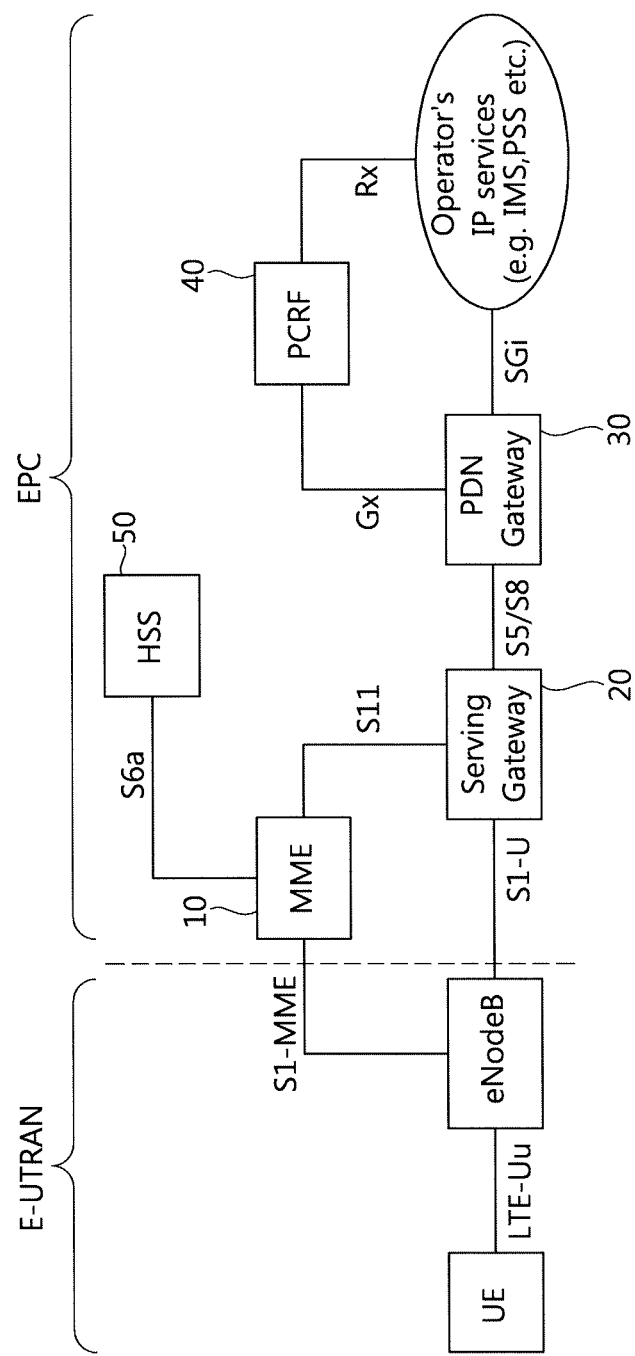
FIG. 1 is a view illustrating an Evolved Packet System which is associated with the Long Term Evolution (LTE) system.

FIG. 1 is a view illustrating an Evolved Packet System which is associated with the Long Term Evolution (LTE) system. The LTE system aims to provide seamless Internet Protocol (IP) connectivity between a user equipment (UE) and a packet data network (PDN), without any disruption to the end user's application during mobility. While the LTE system encompasses the evolution of the radio access through an Evolved Universal Terrestrial Radio Access Network (E-UTRAN) which defines a radio protocol architecture between a user equipment and a base station, it is accompanied by an evolution of the non-radio aspects under the term 'System Architecture Evolution' (SAE) which includes an Evolved Packet Core (EPC) network. The LTE and SAE comprise the Evolved Packet System (EPS).

The EPS uses the concept of 'EPS bearers' to route IP traffic from a gateway in the PDN to the UE. A bearer is an IP packet flow with a specific Quality of Service (QoS) between the gateway and the UE. The E-UTRAN and EPC together set up and release the bearers as required by applications.

The EPC, which is also referred to as the core network (CN), controls the UE and manages establishment of the bearers. As depicted in FIG. 1, the node (logical or physical) of the EPC in the SAE includes a Mobility Management Entity (MME) 10, a PDN gateway (PDN-GW or P-GW) 30, a Serving Gateway (S-GW) 20, a Policy and Charging Rules Function (PCRF) 40, a Home subscriber Server (HSS) 50, etc.

The MME 10 is the control node which processes the signaling between the UE and the CN. The protocols running between the UE and the CN are known as the Non-Access Stratum (NAS) protocols. Examples of functions supported by the MME 10 includes functions related to bearer management, which includes the establishment, maintenance and release of the bearers and is handled by the session management layer in the NAS protocol, and functions related to connection management, which includes the establishment of the connection and security between the network and UE, and is handled by the connection or mobility management layer in the NAS protocol layer.

The S-GW 20 serves as the local mobility anchor for the data bearers when the UE moves between eNodeBs. All user IP packets are transferred through the S-GW 20. The S-GW 20 also retains information about the bearers when the UE is in an idle state (known as ECM-IDLE) and temporarily buffers downlink data while the MME initiates paging of the UE to re-establish the bearers. Further, it also serves as the mobility anchor for inter-working with other 3GPP technologies including 2G and 3G network, i.e., GPRS (General Packet Radio Service) and UMTS (Universal Mobile Telecommunications System).

The P-GW 30 serves to perform IP address allocation for the UE, as well as QoS enforcement and flow-based charging according to rules from the PCRF 40. The P-GW 30 performs QoS enforcement for Guaranteed Bit Rate (GBR) bearers. It also serves as the mobility anchor for inter-working with non-3GPP technologies such as CDMA2000 and WiMAX networks.

The PCRF 40 serves to perform policy control decision-making, as well as for controlling the flow-based charging functionalities.

The HSS 50, which is also referred to as a Home Location Register (HLR), contains users' SAE subscription data such as the EPS-subscribed QoS profile and any access restrictions for roaming. Further, it also holds information about the PDNs to which the user can connect. This can be in the form of an Access Point Name (APN), which is a label according to DNS (Domain Name system) naming conventions describing the access point to the PDN, or a PDN Address which indicates subscribed IP addresses.

Between the EPS network elements shown in FIG. 1, various interfaces such as an S1-U, S1-MME, S5/S8, S11, S6a, Gx, Rx and SGi are defined.

Figure 2:
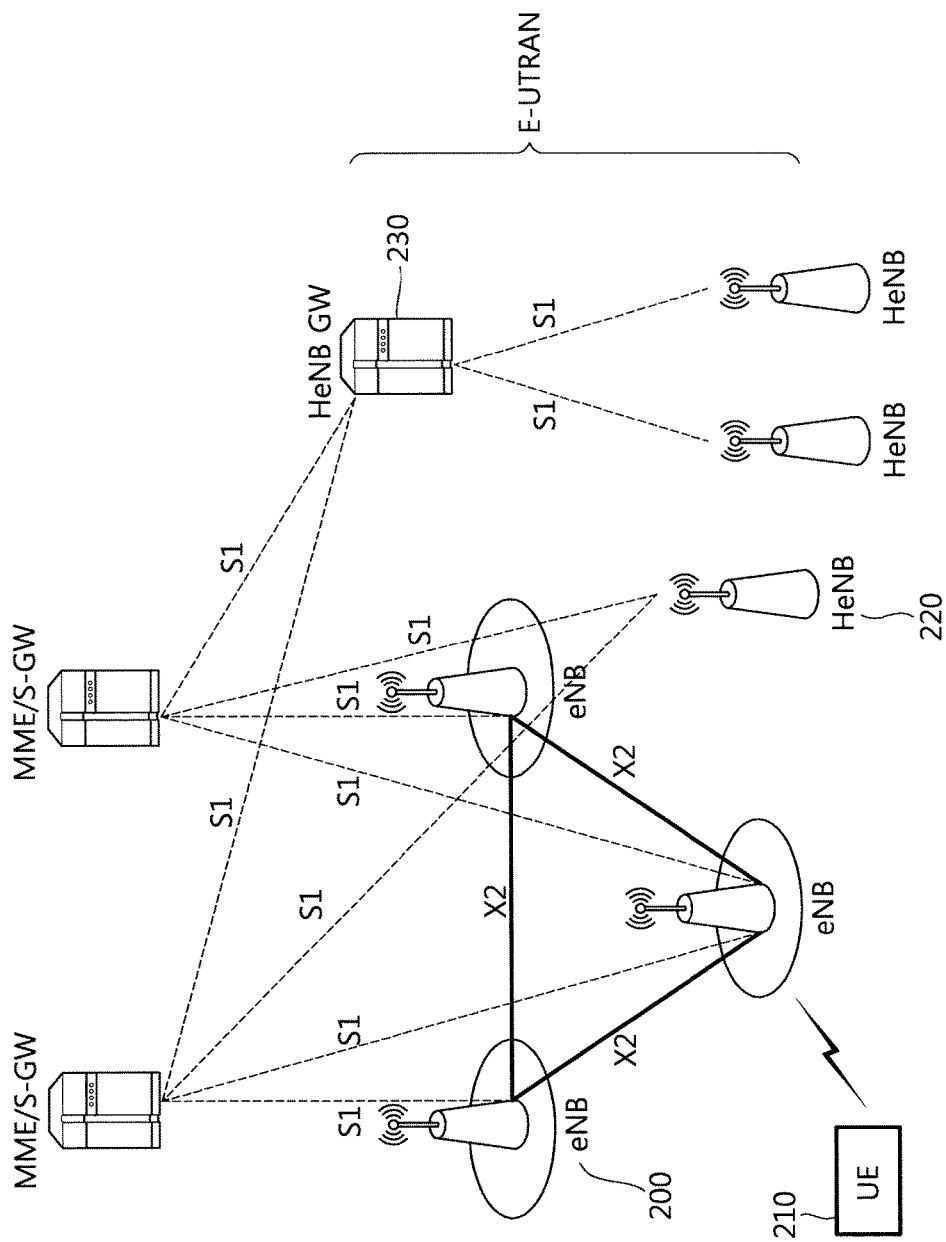
FIG. 2 is a view illustrating an overall architecture of the E-UTRAN to which the following technical features are applied.

FIG. 2 is a view illustrating an overall architecture of the E-UTRAN to which the following technical features are applied.

The E-UTRAN includes at least one eNB (evolved-Node B) 200 providing a user plane and a control plane towards a user equipment (UE) 210. The UE can be fixed or mobile and can be referred to as another terminology, such as a MS (Mobile Station), a UT (User Terminal), an SS (Subscriber Station), an MT (mobile terminal), a wireless device, or the like. The eNB 200 may be a fixed station that communicates with the UE 100 and can be referred to as another terminology, such as a base station (BS), a NB (NodeB), a BTS (Base Transceiver System), an access point, or the like.

The protocols running between the eNBs 200 and the UE 210 are known as the Access Stratum (AS) protocols.

The BSs (or eNBs) 200 are interconnected with each other by means of an X2 interface. The BSs 200 are also connected by means of the S1 interface to the aforementioned Evolved Packet Core EPC elements, more specifically to the Mobility Management Entity (MME) by means of the S1-MME and to the Serving Gateway (S-GW) by means of the S1-U.

The E-TURAN architecture depicted in FIG. 2 may further comprise a Home evolved Node B (HeNB) 220 and an HeNB GW (HeNB gateway) 230.

The HeNB 220 is fundamentally similar to a typical eNB, but it can be simple devices typically installed by end users themselves. The HeNB 220 is also referred to as an HNB (home NB), a femto cell, a home cellular base station, etc. The HeNB 220 behaves like a cellular network with respect to communication devices, which can use their regular cellular network radio interface to communicate with them, and connects to a cellular network operator's core network through the alternate network access, such as Internet access via fiber, DSL or cable subscriptions. In general, the HeNB 220 has a low radio transmission output power compared to the BS owned by mobile communication service providers. Therefore, the service coverage provided by the HeNB 220 is typically smaller than the service coverage provided by the eNB 200. Due to such characteristics, the cell provided by the HeNB 220 is classified as a femto cell in contrast to a macro cell provided by the eNB 200 from a standpoint of the service coverage.

Hereinafter, the concept of an Access Point Name APN is explained. The APN is the name of an access point previously defined within a network to find a P-GW when a requested service is passed through the P-GW to access a network. The APN is provided to the UE, and a suitable P-GW is determined for data transmission and reception based on the APN.

The APN can be a configurable network identifier used by a mobile device when connecting to a carrier. The carrier will then examine this identifier to determine what type of network connection should be created, for example: what IP addresses should be assigned to the wireless device, what security methods should be used, and how/or if, it should be connected to some private customer network. More specifically, the APN identifies an IP Packet Data Network (PDN), which a mobile data user wants to communicate with. In addition to identifying the PDN, the APN may also be used to define the type of service. The APN is used in various access networks such as a general packet radio service (GPRS) and an evolved packet core (EPC).

Hereinafter, the concept of an EPS bearer is explained. The EPS (Evolved Packet System) uses the concept of EPS bearers to route IP traffic from a gateway in the PDN (pack data network) to the UE. The EPS bearer is an IP packet flow with a Quality of Service (QoS) between the gateway and the UE. The E-UTRAN and EPC (Evolved Packet Core) together set up and release EPS bearers as required by applications.

The EPS bearer is typically associated with the QoS. Multiple bearers can be established for a user in order to provide different QoS streams or connectivity to different PDNs. For example, a user might be engaged in a voice (e.g., VoIP) call while at the same time performing web browsing or File Transfer Protocol (FTP) download. A VoIP bearer would provide the necessary QoS for the voice call, while a best-effort bearer would be suitable for the web browsing or FTP session.

Broadly, EPS bearers can be classified into two categories based on the nature of the QoS they provide. The two categories are Minimum Guaranteed Bit Rate (GBR) bearers and Non-GBR bearers. The GBR bearers have an associated GBR value for which dedicated transmission resources are permanently allocated at bearer establishment/modification. Bit rates higher than the GBR may be allowed for a GBR bearer if resources are available. On the other hand, the non-GBR bearers do not guarantee any particular bit rate. For these bearers, no bandwidth resources are allocated permanently to the bearer.

Further, EPS bearers can be classified in a different manner. In particular, the EPS bearers can be classified into a default bearer and a dedicated bearer. The default bearer is an EPS bearer which is first established for a new PDN connection and remains established throughout the lifetime of the PDN connection. The default bearer gets established with every new PDN connection. Namely, when the UE connects to the P-GW by means of a procedure called 'Initial Attach', a new or default bearer is created and its context remains established throughout the lifetime of that PDN connection. The UE can be attached to more than one P-GW, and thus the UE can have more than one default bearer. The default EPS bearer is a non-GBR bearer and associated with a best effort QoS, wherein the best effort QoS is the lowest of all QoS traffic classes. Bearers which are not created at the initial attach procedure can be referred to as dedicated bearers. The dedicated bearer is an EPS bearer that is associated with uplink packet filters in the UE and downlink packet filters in the PDN GW where the filters only match certain packets.

Figure 3:
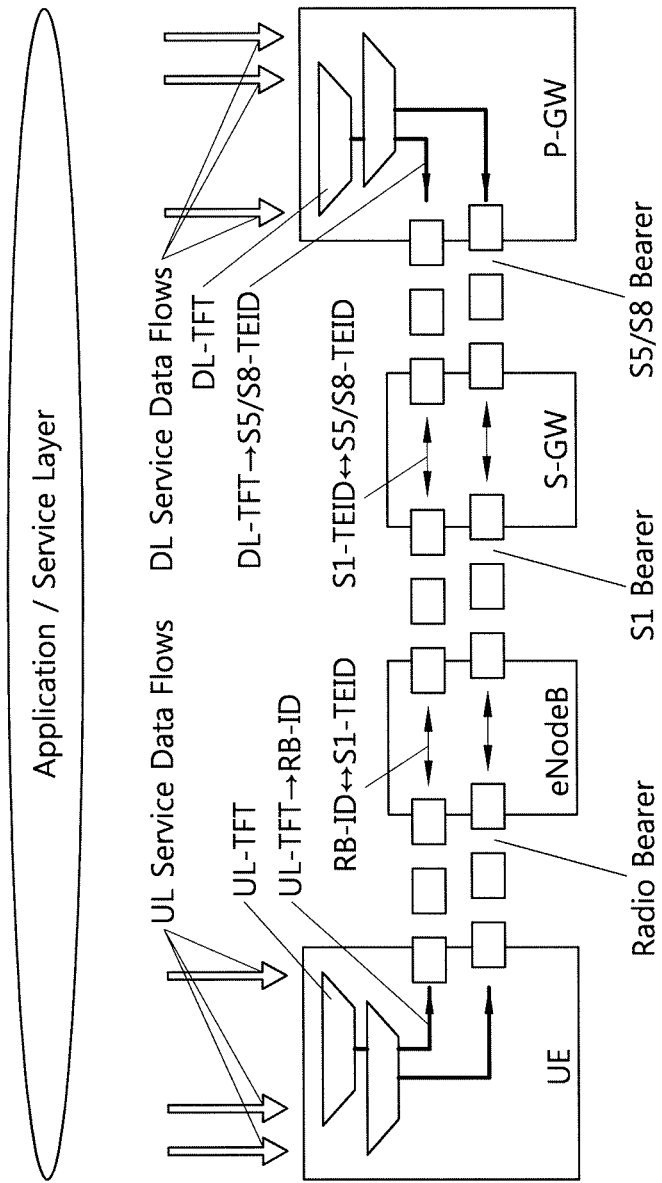
FIG. 3 is a view illustrating EPS bearers crossing multiple interfaces.

Hereinafter, the relationship of the EPS bearer and lower layer bearers such as S1, S5/S8, radio bearers and E-RAB is explained. The EPS bearer has to cross multiple interfaces as shown in FIG. 3—the S5/S8 interface from the P-GW to the S-GW, the S1 interface from the S-GW to the eNodeB, and the radio interface (also known as the LTE-Uu interface) from the eNodeB to the UE. Across each interface, the EPS bearer is mapped onto a lower layer bearer, each with its own bearer identity. Each node keeps track of the binding between the bearer IDs across its different interfaces.

An S5/S8 bearer transports the packets of the EPS bearer between the P-GW and the S-GW. The S-GW stores a one-to-one mapping between an S1 bearer and an S5/S8 bearer. Each bearer is identified by the GTP (GPRS Tunneling Protocol) based Tunnel Endpoint ID (also known as a TEID) across both interfaces.

An S1 bearer transports the packets of an EPS bearer between the S-GW and the eNodeB. A radio bearer (also known as a radio data bearer) transports the packets of an EPS bearer between the UE and the eNodeB. Each bearer is identified by the GTP (GPRS Tunneling Protocol) tunnel endpoint ID (also known as a TEID or a GTP TEID) across both interfaces.

Further, the concept of the E-RAB (E-UTRAN Radio Access Bearer) may be used. An E-RAB transports the packets of an EPS bearer between the UE and the EPC (GPRS Tunneling Protocol), more specifically to the S-GW through eNB. When an E-RAB exists, there is a one-to-one mapping between this E-RAB and an EPS bearer.

IP packets mapped to the same EPS bearer receive the same bearer-level packet forwarding treatment (e.g., scheduling policy, queue management policy, rate shaping policy, or RLC configuration). Providing different bearer-level QoS thus requires that a separate EPS bearer is established for each QoS flow, and user IP packets must be filtered into the different EPS bearers.

Hereinafter, the concept of Non-Access Stratum (NAS) states and Access Stratum (AS) states. A UE's behavior can be defined using a number of states, i.e., NAS and AS states, which describe whether the UE is registered with the Evolved Packet Core (EPC) and whether it is active or idle.

The first NAS states, i.e., EMM-REGISTERED and EMM-DEREGISTERED, are associated with EPC mobility management (EMM) which is managed by the EMM protocol in the UE and the MME. The UE's EMM states depend on whether the UE is registered with the EPC. In the state EMM-REGISTERED, the UE is registered with a serving MME and a serving gateway (S-GW) and has an IP address and a default EPS bearer. In the state EMM-DEREGISTERED, the UE is switched off or out of coverage.

The second NAS states, i.e., ECM-IDLE and ECM-CONNECTED, are associated with EPS connection management (ECM). These states are managed by the EMM protocol. The state ECM-IDLE is also referred to as EMM-IDLE, and the state ECM-CONNECTED is also referred to as EMM-CONNECTED in a certain standard document (e.g., 3GPP TS 24.301) while terminologies 'ECM-CON- NECTED' and 'ECM-IDLE' are preferred in other standard documents (e.g., 3GPP TS 23.401). The UE's ECM states depend of whether the UE is active or on standby, from a NAS protocol perspective. An active UE is in ECM-CONNECTED state. In this state, all the data bearers and signalling radio bearers are in place. When on standby, a mobile is in ECM-IDLE. In this state, it would be inappropriate to hold all the bearers in place. Therefore, the network tears down a UE's S1 bearer and radio bearers whenever the UE enters ECM-IDLE. However, the EPS bearers remain in place, and the S5/S8 bearers also remain in place. When in idle, the MME does not know exactly where an idle UE is located. Instead, the MME just knows which tracking area (TA) the UE is in. The detailed features of the TA will be described below.

The AS states are associated with a radio resource control (RRC). These states are managed by the RRC protocol in the UE and a serving eNB. The UE's RRC state depends on whether it is active or idle, from an AS protocol perspective. An active UE is in RRC_CONNECTED state. In this state, the UE is assigned to a serving eNB, and can freely communicate using signalling message on Signalling Radio Bearers 1 (SRB1). When on standby, a UE is in RRC_IDLE. Mobility control in RRC_IDLE is UE-controlled (cell-reselection), while in RRC_CONNECTED it is controlled by the E-UTRAN (handover).

Hereinafter, the concept of mobility management (MM) and a tracking area (TA) (MM) is explained in detail. All UE-related information in the access network can be released during periods of data inactivity, i.e., the ECM-IDLE. The MME retains the UE context and information about the established bearers during the idle periods.

To allow the network to contact a UE in the ECM-IDLE, the UE updates the network as to its new location whenever it moves out of its current Tracking Area (TA). This procedure is called a 'Tracking Area Update (TAU)', and a similar procedure is also defined in a universal terrestrial radio access network (UTRAN) or GSM EDGE Radio Access Network (GERAN) system and is called a 'Routing Area Update (RAU)'. The MME serves to keep track of the user location while the UE is in the ECM-IDLE state.

When there is a need to deliver downlink data to the UE in the ECM-IDLE state, the MME transmits a paging message to all base stations (i.e., eNodeBs) in UE registered tracking area(s) (TA). Thereafter, eNBs start to page the UE over the radio interface. On receipt of a paging message, the UE performs a certain procedure which results in changing the UE to ECM-CONNECTED state. This procedure is called a 'Service Request Procedure'. UE-related information is thereby created in the E-UTRAN, and the bearers are re-established. The MME is responsible for the re-establishment of the radio bearers and updating the UE context in the eNodeB.

When the above-explained mobility management (MM) is applied, a mobility management (MM) back-off timer can be further used. Upon receipt of a time value associated with the MM back-off timer, the UE may activate the MM back-off timer according to the time value given by the network. Under the current 3GPP specification, while the MM back-off timer is running, UE is prohibited from performing the Tracking Area Update or Routing Area Update to the network. However, even when the MM back-off timer is running, the UE can receive a paging message and be thereby paged, if the network has downlink data for the UE. As explained above, when the UE responding the page message, the Service Request Procedure is required under the current 3GPP specification.

Hereinafter, the concept of an idle mode signalling reduction (ISR) function is explained in detail. The ISR function serves to enhance efficiency of network resources by reducing signaling for location registration (i.e., location update/registration update) when the UE moves between different access networks such as E-UTRAN and UTRAN/GERAN. When the UE camps on the E-UTRAN cell, the UE performs location registration on the MME. Cell 'camping on' indicates that a UE has completed a cell selection/reselection process and has chosen a cell. In the meantime, when the UE moves to the UTRAN/GERAN cell and camps on that cell, the UE performs location registration on the SGSN. Therefore, when the UE frequently moves between the E-UTRAN and the UTRAN/GERAN, network resources may be wasted due to frequent location registration procedures. In order to reduce the waste of network resources, the ISR function has been proposed.

According to the ISR function, once the UE respectively performs location registration on the MME and the SGSN (two mobility management nodes) via the E-UTRAN and the UTRAN/GERAN, the UE in an idle mode does not perform an additional location registration when moving between two pre-registered Radio Access Technologies (RATs), or when reselecting a cell. If there is downlink (DL) data that should be sent to a corresponding UE in an ISR activated state and an idle mode, paging is simultaneously delivered to the E-UTRAN and the UTRAN/GERAN. This allows the network to successfully search for the UE and to deliver the DL data to the UE.

Hereinafter, the concept of session management (SM) and a session management (SM) back-off timer is explained in detail. The session management (SM) is related to session management (SM) signaling which can be used for establishing PDN connectivity, allocating an additional bearer or modifying a QoS of a certain bearer. For example, when the new service (e.g., VoIP service) is initiated, the UE may request the network to allocate a new bearer by using the SM signaling. Further, the UE may request to change a QoS of a certain bearer by using the SM signaling. The SM signaling can be initiated by EPS Session Management (ESM) requests from the UE (e.g., PDN Connectivity, Bearer Resource Allocation, or Bearer Resource Modification Requests).

Under the current 3GPP specification, APN-based Session Management (SM) congestion control can be applied. In particular, the MME may reject the EPS Session Management (ESM) requests from the UE with a certain back-off timer when ESM congestion associated with the APN is detected. The above-mentioned timer can be referred to as a 'Session Management (SM) back-off timer'. In the current specification, the SM back-off time can be referred to as another terminology such as T3396 value, etc.

The MME may store a Session Management back-off time value (or SM back-off time value) when congestion control is active for an APN. The MME may immediately reject any subsequent request from the UE targeting to the APN before the stored SM back-off timer is expired.

The SM back-off time (or time value) is transmitted from the MME to the UE when the network (e.g., MME) rejects the EPS Session Management (ESM) requests. For example, the SM back-off time value can be transmitted to the UE when a request for bearer resource modification or bearer resource allocation is rejected by the MME. In particular, the SM back-off time value may be transmitted to the UE via a BEARER RESOURCE ALLOCATION REJECT message and/or BEARER RESOURCE MODIFICATION REJECT message.

Upon reception of the SM back-off time value in the EPS Session Management reject message, the UE activates an SM back-off timer according to the received SM back-off time value. In particular, if SM back-off timer is provided in the rejected EPS Session Management Request message, the UE shall not initiate any Session Management procedures for the congested APN (e.g., sending PDN CONNECTIVITY REQUEST, BEARER RESOURCE MODIFICATION REQUEST or BEARER RESOURCE ALLOCATION REQUEST) except for releasing the PDN connection (e.g. sending PDN Disconnection Request). The UE may initiate Session Management procedures for other APNs. If the rejected EPS Session Management Request message is a PDN connectivity request without specifying an APN, as part of attach request, the UE may not initiate any Session Management requests without APN. Further, the UE may initiate Session Management procedures for specific APN. The UE can support a separate SM back-off timer for every APN that the UE may activate.

Hereinafter the concept of 'TIN' is explained in detail. When a UE accesses a network, the network may allocate a temporary identity to the UE. For instance, a 2G/3G network (e.g., GERAN/UTRAN) allocates a Packet Temporary Mobile Subscriber Identity P-TMSI to the UE, while the SAE system allocates a Global Unique Temporary Identity (GUTI) to the UE. Since the UE may move between different networks (e.g., GERAN/UTRAN/E-UTRAN), when the UE is handed over from an original CN node to a new CN node, the original CN node needs to be found by using a temporary identity of the UE to obtain the context of the UE, for achieving rapid handover. Therefore, when using the ISR function, the UE hold a Temporary Identity used in Next update (TIN), which is a parameter indicating which type of mobility management context shall be used in the next signaling with the core network, which can be TAU or RAU. Possible values of TIN include 'GUTI' (i.e., the UE's identification known to the MME), P-TMSF (i.e., the UE's identification known to the SGSN) and 'RAT related TMSI'. For instance, in a situation where the TIN is set to the GUTI, the SGSN can fetch the UE's context from the MME by receiving a RAU request with the GUTI. While the GUTI is not a native identification to the SGSN, context exchange can be performed by using the GUTI to locate the MME holding the UE's context.

Figure 4:
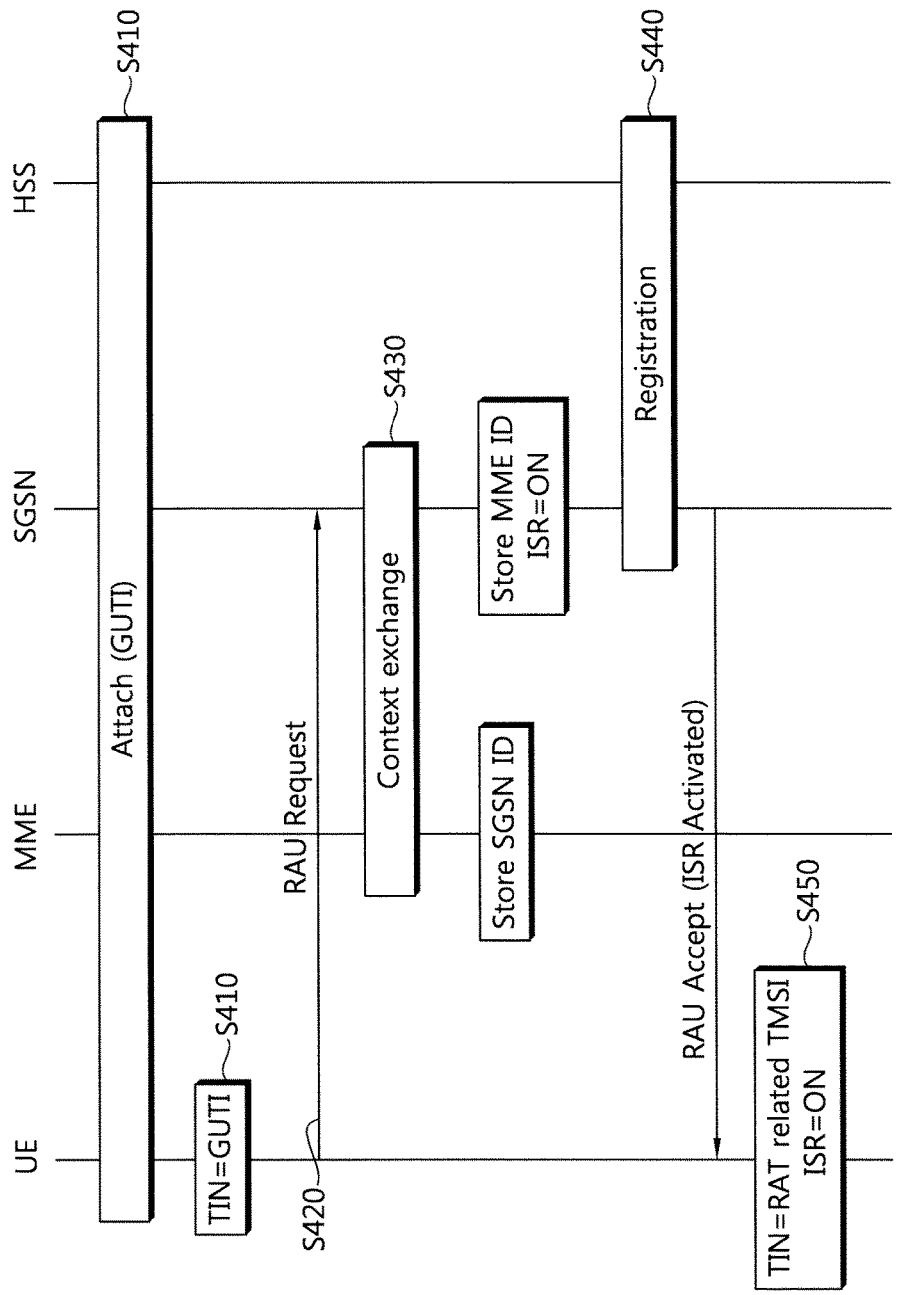
FIG. 4 is a flowchart illustrating a procedure for ISR activation by using TIN.

FIG. 4 is a flowchart illustrating a procedure for ISR activation by using the TIN. In step S410, in a case where no ISR is activated, a normal attach is performed in the E-UTRAN. As a result, the UE sets its TIN to 'GUTI'. As discussed above, once the TIN is set to 'GUTI', the UE uses 'GUTI' for a subsequent TAU or RAU procedure.

In step S420, the UE now selects GERAN/UTRAN as its desired access although it stays in the idle mode. The UE transmits a RAU request to the SGSN by using the 'GUTI' as indicated by its TIN. In particular, the UE transmits a RAU request to the SGSN including a Routing Area ID and a P-TMSI which is mapped from the GUTI.

In step S430, the SGSN fetches from the MME the UE's context, and the MME indicates ISR support and SGSN determines that it can connect to the same SGW the MME has connection to for the UE. In step S440, registration of SGSN with the HSS is performed.

In step S450, in the RAU accept message, an indication for ISR activation is included. Under the current 3GPP specification, the UE sets its TIN to 'RAT related TMSI' when the ISR function is activated. When the TIN is set to 'RAT related TMSI', a UE's identification for a subsequent TAU or RAU procedure is determined by a cell which the UE is currently camping on. Namely, when the TIN is set to 'RAT related TMSI', the UE uses the GUTI when camping on an E-UTRAN cell and uses the P-TMSI when camping on a GERAN/UTRAN cell.

The technical features in this description comprise a number of embodiments related to mobility and session management. Hereinafter, the first embodiment which is related to controlling a number of timers associated with the ISR function is explained in detail.

Figure 5:
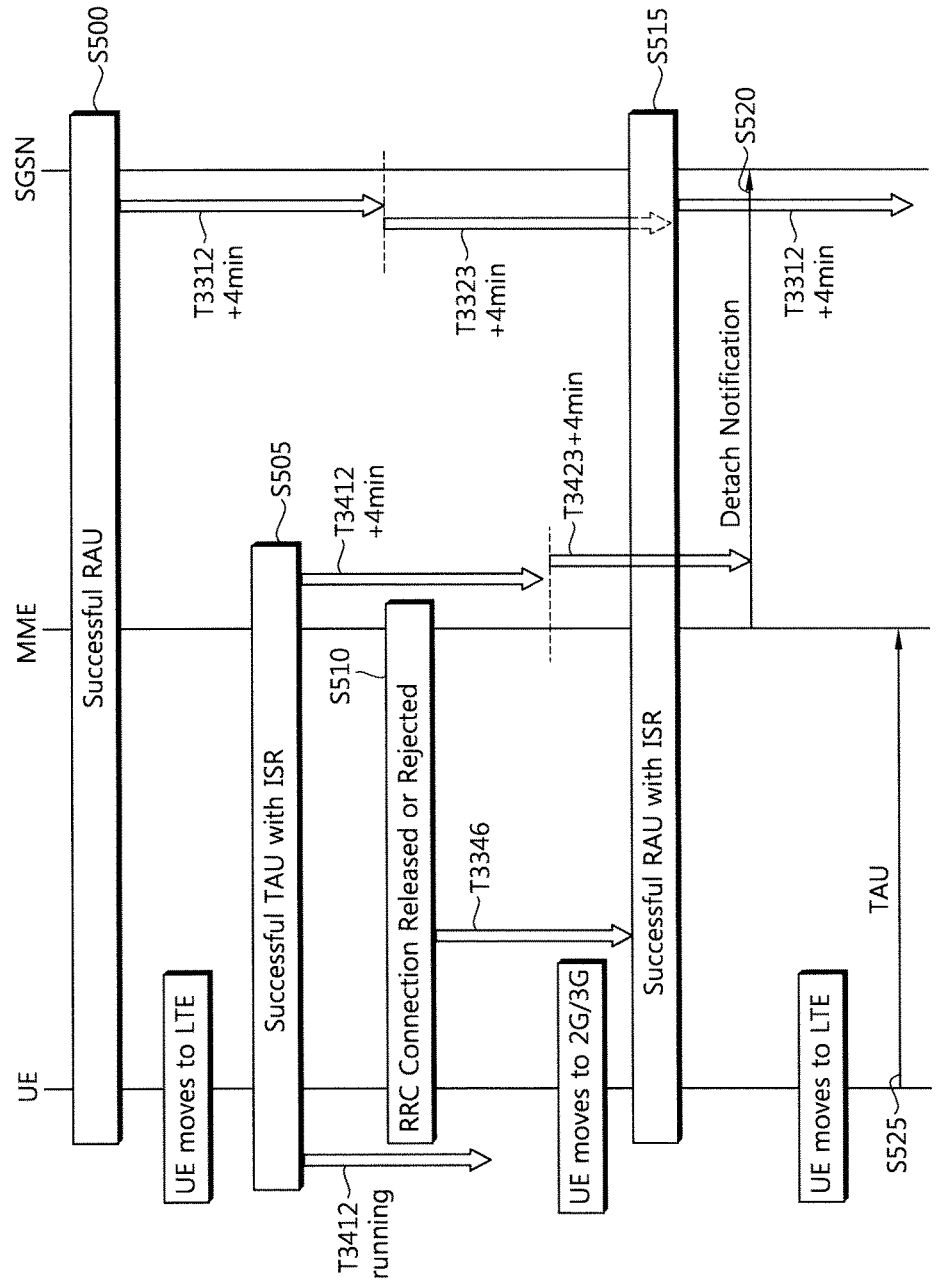
FIG. 5 is a flowchart illustrating a procedure associated with ISR function.

The first embodiment is applicable to a wireless communication system comprising two different networks, e.g., LTE and 2G/3G networks, each having a number of timers associated with the ISR function. FIG. 5 is a flowchart illustrating a procedure associated with the ISR function. In step S500, the UE performs a successful routing area update (RAU) procedure so that the UE context is maintained by the SGSN. Further, as a result of the successful RAU, a period RAU (P-RAU) timer is initiated. The P-RAU timer is used to periodically notify availability of the UE and maintained by the UE and the SGSN. A time value for the P-RAU timer maintained by the SGSN can be 4 minutes greater than a time value for the P-RAU timer maintained by the UE. In the current 3GPP standard documents, the P-RAU timer is referred to as a timer 'T3312'.

While the P-RAU is running, the UE context is maintained by the CN node (i.e., the SGSN) so that an additional RAU procedure is not required. Once a subsequent RAU procedure is successfully finished, the P-RAU timer is reset and reinitiated regardless of whether there is any previous P-RAU timer is running.

In step S505, the UE performs a successful tracking are update (TAU) procedure after it moves into a coverage of the E-UTRAN. In particular, the UE transmits a TAU request message to the MME. Since the UE was in an old network (e.g., GERAN/UTRAN) before it moves into a new network, the UE identity in the TAU request message is configured based on a P-TMSI and a routing area identity (RAI). Since the UE identity associated with the old network (e.g., GERAN/UTRAN) is included in the TAU request message, the network can enable the ISR function. In particular, in response to the TAU request message, the MME transmits a TAU accept message indicating the ISR is enabled or activated. Upon activating the ISR function, the UE and the MME start their P-TAU timers, respectively. Similar to the P-RAU timer, P-TAU is used to periodically notify availability of the UE and maintained by the UE and the CN node (i.e., MME). Further, a timer value for the P-TAU timer used by the MME can be 4 minutes greater than a time value for the UE. In the current 3GPP standard documents, the P-TAU timer is referred to as a timer 'T3412'.

In addition to the P-RAU timer and the P-TAU timer, additional timers are initiated when the ISR function is enabled. In particular, a deactivate ISR timer is further initiated following the P-TAU timer and the P-RAU timer. The deactivate ISR timer is configured for both the UE and the CN node, and it is started at both UE and the network in conditions that UE was in another RAT and cannot perform P-TAU/RAU when the corresponding timer expires. While the deactivate ISR timer is running the UE context is maintained by the CN node. Similar to the P-RAU timer and P-TAU timer, a timer value used by the network for the deactivate ISR timer can be 4 minutes greater than a time value for the UE. In the current 3GPP standard documents, the deactivate ISR timer is referred to as a timer 'T3323', a timer for GERAN/UTRAN, and a timer 'T3423', a timer for E-UTRAN.

After the ISR function being enabled, the UE may try to establish an RRC connection as depicted in step S510. In FIG. 5, it is assumed that the UE's RRC connection attempt is unsuccessful due to network congestion. In this case, the UE will be given the MM backoff timer as discussed above. The MM backoff timer is referred to as a timer 'T3346'. As discussed above, while the MM backoff timer is running, the UE is prevented from performing a TAU procedure.

When T3346 is running, and UE's T3312 timer may have expired while UE is still in the LTE coverage. In this case, UE is in EMM-REGISTERED.NORMAL-SERVICE state but cannot perform TAU to the MME, and the UE also does not start its deactivate ISR timer due to the state UE is in.

As depicted in FIG. 5, the UE later may move back to a coverage of the old network again, and transmit a RAU request message after the timer T3346 expires. In step S515, the UE transmits a RAU request message and receives a RAU accept message indicating that the ISR function is enabled or activated. Upon successfully performing the RAU operation to the SGSN, the deactivate ISR timer kept by the SGSN is stopped and the P-RAU timer is initiated again as disclosed in FIG. 5.

As discussed above the deactivate ISR timer of the MME is further initiated when the ISR function is enabled. However, if a subsequent TAU operation is not performed to the MME, then the deactivate ISR timer will expire. In step S520, if the deactivate ISR timer of the MME expires, and then the MME transmits a detach notification message to the SGSN, thereby releasing the UE context maintained by the MME.

After the UE context is released, the UE may move to a coverage of E-UTRAN and further transmit the TAU request message to the MME. In this situation, the UE's identity in the TAU request message is based on the GUTI, since the UE's TIN is set to 'RAT related TMSI' and the UE is camping on an E-UTRAN cell. In this situation, the MME does not fetch the UE's context from the SGSN, since the GUTI is a native identification of the MME. However, MME no longer maintains UE's context. Therefore, there occurs a technical problem in which the MME cannot obtain the UE context.

In other words, the technical problem may occur where: the UE has 'ISR enabled' in LTE; the UE performs a service request but rejected by RRC with the MM-BO time value; the UE in LTE coverage does not perform TAU after the P-TAU expires while the MM-BO timer running, and does not start deactivate ISR timer; the UE moves to 2G/3G coverage; the MM-BO timer expires; the UE registers to the SGSN and still has ISR enabled; the MME's implicit detach timer expires; the MME sends a detach notification to the SGSN; and then the UE moves to LTE with 'TIN' set to 'RAT related TMSI'. In this case, it is not clear whether UE will perform a TAU since neither T3412 nor T3423 is running. Further, even if the UE performs the TAU, it would use a native GUTI instead of a mapped GUTI from the P-TMSI, due to the erroneous setting of TIN. This causes the above technical problem since the MME no longer finds the UE context from the native GUTI.

Figure 6:
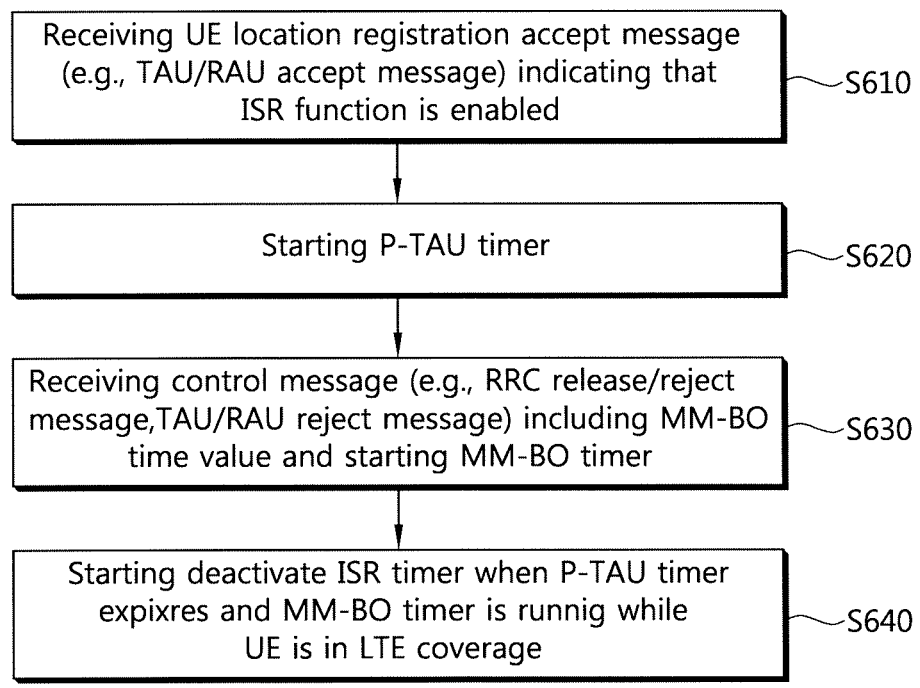
FIG. 6 is a flowchart illustrating a procedure handling timers associated with the ISR function in a wireless communication system.

One example of the first embodiment described in FIG. 6 solve the above problem by controlling a deactivate ISR timer in a certain situation. FIG. 6 is a flowchart illustrating a procedure handling timers associated with the ISR function in a wireless communication system. The example depicted in FIG. 6 is applicable to a wireless communication system including the first type network (e.g., LTE) communicating based OFDM symbols, and the second type network (e.g., 2G/3G) different from the first type network. In particular the method of FIG. 6 is applicable to a UE moves between a coverage of the LTE and a coverage of 2G/3G network.

Referring to FIG. 6, in step S610, the UE receives a UE location registration accept message indicating that the ISR function is enabled. The UE location registration accept message can be TAU accept message transmitted via the LTE or a RAU accept message received via the 2G/3G network. Information indicating the ISR function is enabled can be included an information element of an EPS update result. The EPS update result is 1-octect information element and includes 4-bit of 'EPS update result information element identifier' directly followed by 1-bit of 'Spare' bit coded as zero, which is also directly followed by 3-bit of 'EPS update result value'. The 3-bit included in the 'EPS update result value' can be '000' when tracking area (TA) is updated and '001' when combined TA/LA (i.e., tracking area associated with E-UTRAN/location area associated with GERAN/UTRAN) is updated. Further, the 3-bit included in the 'EPS update result value' can be '100' when TA is updated and the ISR function is activated, and can be '001' when combined TA/LA is updated and the ISR function is activated.

In step S620, in response to receiving the UE location registration accept message indicating that the ISR function is enabled, the UE starts the P-TAU timer. As discussed above, the P-TAU timer is associated with the MME and used to periodically notify availability of the UE. Further, the P-TAU timer can be followed by the deactivate ISR timer in a situation defined by one of embodiments of the present description. In the meantime, if the ISR function is activated, the UE can keep both the P-TAU timer (timer T3412) and the P-RAU timer (timer T3312). The two separate timers run in the UE for updating MME and SGSN independently. A time value for the P-TAU timer can be defined in various manners. For instance, the timer value can be pre-defined or given by the UE location registration accept message.

In step S630, the UE receives the MM backoff time value and starts the MM backoff timer. As discussed above, the MM backoff time value can be given when the RRC connection was released or rejected. In particular, the MM backoff timer value can be provided by an RRC connection release message, an RRC connection reject message, a RAU reject message, and/or a TAU reject message.

In step S640, the UE in the coverage of the first type network (e.g., LTE) starts the deactivate ISR timer when the P-TAU timer expires and especially when the MM-BO timer is running. As discussed in step S525 of FIG. 5, if the deactivate ISR timer is not initiated when the UE is in LTE area and when the MM-BO timer is running, the UE context may not be fetched from the SGSN. Therefore, it is preferred that the UE in the LTE system starts the deactivate ISR timer when the P-TAU timer expires and the MM-BO timer is running, even if UE is still in the EMM-REGISTERED-.NORMAL-SERVICE state.

With the above steps, the UE will be able to set its TIN to 'P-TMSI' after the deactivate ISR timer expires. With the correct TIN setting, UE would use the P-TMSI and RAI to perform TAU to the MME, which no longer maintains the UE context.

Hereinafter, the second embodiment of the present description will be discussed. The second embodiment is related to the session management (SM) signaling/timer and the access point name (APN) which are explained above. Further, the second embodiment is related to an international mobile subscriber identity (IMSI) paging.

The paging procedure is used by the network to request the establishment of a non-access stratum (NAS) signaling connection to the UE. For paging purposes, the mobile is paged with a system architecture evolution temporary mobile subscriber identity (S-TMSI) or the IMSI. Paging for EPS services using the IMSI is an abnormal procedure used for error recovery in the network. In particular, upon receiving the paging message using the UE's IMSI, the UE performs a re-attach procedure.

In general, a commercial operator has requirements for the UE to attach a certain APN during the attach procedure. For instance, the operator may require an always-on IP multimedia subsystem (IMS) APN.

However, the aforementioned SM back-off timer (T3396) for this APN may be running, when the paging is received. If the T3396 timer is running, the UE cannot initiate a PDN connectivity request procedure to this APN during the attach procedure. Therefore, the UE may not response to the IMSI paging properly.

In order to solve the problem, the second embodiment proposes to stop T3396 associated with the APN, or all timers T3396 which are running after receiving an IMSI page.

Figure 7:
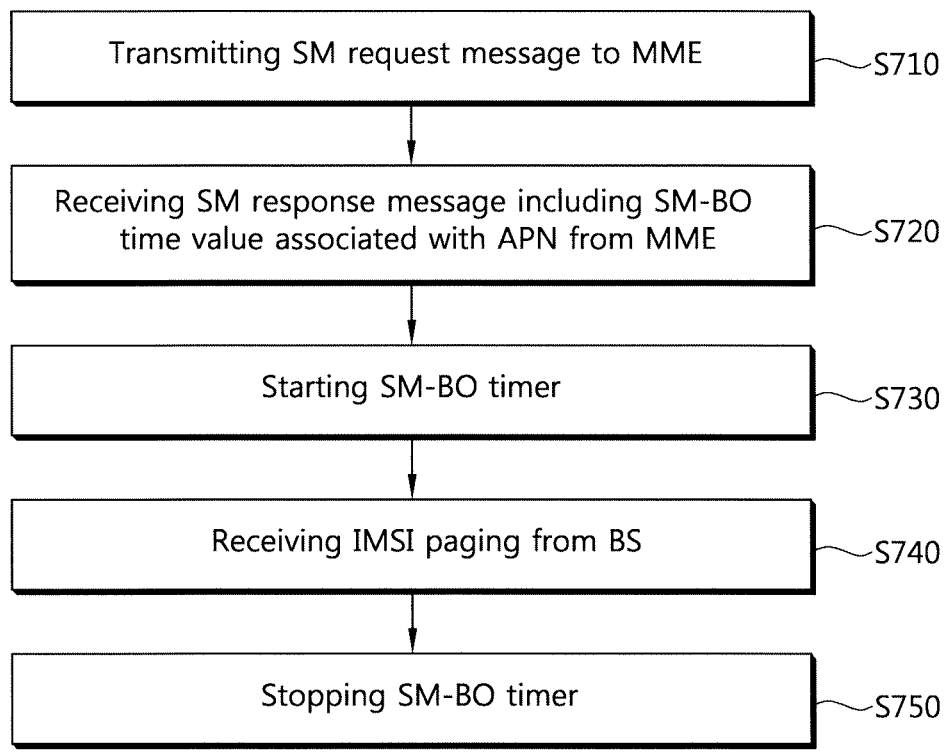
FIG. 7 is a flowchart illustrating a method of handling SM timers.

FIG. 7 is a flowchart illustrating a method of handling SM timers. Referring to FIG. 7, in step S710, the UE transmits a SM request message to the MME. Examples of the SM request message include a PDN connectivity request, a bearer resource modification request message, and/or a bearer resource allocation request message.

In step S720, the UE receives a SM response message as a response to the SM request message including a SM back-off time value associated with an APN. Examples of the SM response message received from the MME include a PDN connectivity reject, a bearer resource modification reject, and/or bearer resource allocation reject. In step S730, the UE starts a SM back-off timer based on the received SM back-off time value.

In step S740, the UE receives an IMSI paging message from a base station. Thereafter, the UE stops SM back-off timers (i.e., all timers running or a specific timer associated with the APN used for attach) in step S750.

Figure 8:
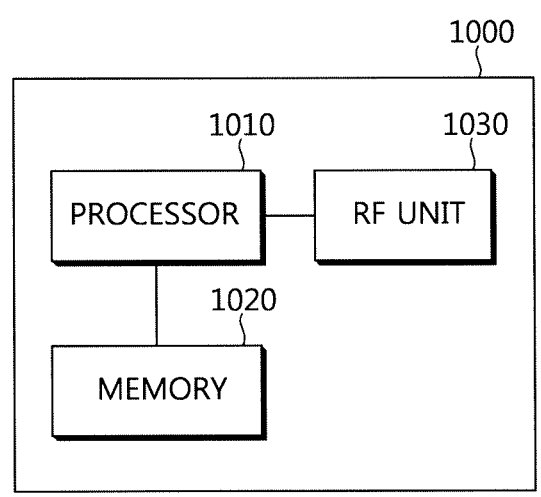
FIG. 8 is a block diagram showing a wireless apparatus to implement technical features of this description.

FIG. 8 is a block diagram showing a wireless apparatus to implement technical features of this description. This may be a part of a UE, or core network (CN) entity. The wireless apparatus 1000 may include a processor 1010, a memory 1020 and a radio frequency (RF) unit 1030.

The processor 1010 may be configured to implement proposed functions, procedures and/or methods described in this description. Layers of the radio interface protocol may be implemented in the processor 1010. The processor 1010 may handle a number of timers as discussed in FIGS. 4-7. The memory 1020 is operatively coupled with the processor 1010, and the RF unit 1030 is operatively coupled with the processor 1010.

The processor 1010 may include application-specific integrated circuit (ASIC), other chipset, logic circuit and/or data processing device. The memory 1020 may include read-only memory (ROM), random access memory (RAM), flash memory, memory card, storage medium and/or other storage device. The RF unit 1030 may include baseband circuitry to process radio frequency signals. When the embodiments are implemented in software, the techniques described herein can be implemented with modules (e.g., procedures, functions, and so on) that perform the functions described herein. The modules can be stored in the memory 1020 and executed by the processor 1010. The memory 1020 can be implemented within the processor 1010 or external to the processor 1010 in which case those can be communicatively coupled to the processor 1010 via various means as is known in the art.

In view of the exemplary systems described herein, methodologies that may be implemented in accordance with the disclosed subject matter have been described with reference to several flow diagrams. While for purposed of simplicity, the methodologies are shown and described as a series of steps or blocks, it is to be understood and appreciated that the claimed subject matter is not limited by the order of the steps or blocks, as some steps may occur in different orders or concurrently with other steps from what is depicted and described herein. Moreover, one skilled in the art would understand that the steps illustrated in the flow diagram are not exclusive and other steps may be included or one or more of the steps in the example flow diagram may be deleted without affecting the scope of the present disclosure.

What has been described above includes examples of the various aspects. It is, of course, not possible to describe every conceivable combination of components or methodologies for purposes of describing the various aspects, but one of ordinary skill in the art may recognize that many further combinations and permutations are possible. Accordingly, the subject specification is intended to embrace all such alternations, modifications and variations that fall within the scope of the appended claims.

What is claimed is:

1. A method of controlling timers in a wireless communication system including a first type network communicating based on a number of orthogonal frequency-division multiplexing (OFDM) symbols and a second type network that is different from the first type network, the method performed by a user equipment (UE) and comprising:
   when an idle mode signaling reduction (ISR) function of the UE is activated in the UE, maintaining a periodic tracking area update (P-TAU) timer and a periodic routing area update (P-RAU) timer,
   wherein the P-TAU timer and the P-RAU timer run in the UE for updating a Mobility Management Entity (MME) and a Serving General packet radio service Support Node (SGSN) independently, and
   wherein the ISR function is activated when an update message activating the ISR function is received by the UE; and
   when the P-TAU timer expires and the UE cannot initiate a tracking area update (TAU) procedure as a mobility management backoff (MM-BO) timer is running, starting a deactivate ISR timer corresponding to the first type network,
   wherein the MM-BO timer is a timer configured to start when a MM-BO time value is received in the UE.

2. The method of claim 1, wherein the MME corresponds to the first type network, and the SGSN corresponds to the second type network.

3. The method of claim 1, wherein the update message is a TAU accept message received via the first type network.

4. The method of claim 1, wherein the update message is a RAU accept message received via the second type network.

5. The method of claim 1, wherein the MM-BO time value is received by a radio resource control (RRC) connection release message, a RRC connection reject message, a RAU reject message, or a TAU reject message.

6. The method of claim 1, further comprising:
   after the deactivate ISR timer is started, transmitting a TAU request if the UE is in a coverage area of the first type network and the MM-BO timer is not running.

7. A user equipment (UE) for controlling timers in a wireless communication system including a first type network communicating based on a number of orthogonal frequency-division multiplexing (OFDM) symbols and a second type network that is different from the first type network, the UE comprising:
  a radio frequency (RF) unit configured to receive and transmit radio signals; and
  a processor configured to:
  control the RF unit,
  when an idle mode signaling reduction (ISR) function of the UE, maintain a periodic tracking area update (P-TAU) timer and a periodic routing area update (P-RAU) timer,
  wherein the P-TAU timer and the P-RAU timer run in the UE for updating a Mobility Management Entity (MME) and a Serving General packet radio service Support Node (SGSN) independently, and
  wherein the ISR function is activated when an update message activating the ISR function is received by the UE; and
  when the P-TAU timer expires and the processor cannot initiate a tracking area update (TAU) procedure as a mobility management backoff (MM-BO) timer is running, start a deactivate ISR timer corresponding to the first type network,
  wherein the MM-BO timer is a timer configured to start when a MM-BO time value is received in the UE.

8. The UE of claim 7, wherein the MME corresponds to the first type network, and the SGSN corresponds to the second type network.

9. The UE of claim 7, wherein the update message is a TAU accept message received via the first type network.

10. The UE of claim 7, wherein the update message is a RAU accept message received via the second type network.

11. The UE of claim 7, wherein the MM-BO time value is received by a radio resource control (RRC) connection release message, a RRC connection reject message, a RAU reject message, or a TAU reject message.

12. The UE of claim 7, wherein the processor is further configured to:
  after the deactivate ISR timer is started, transmit a TAU request if the UE is in a coverage area of the first type network and the MM-BO timer is not running.

* * * * *